United States Patent Office 3,101,620
Patented Aug. 27, 1963

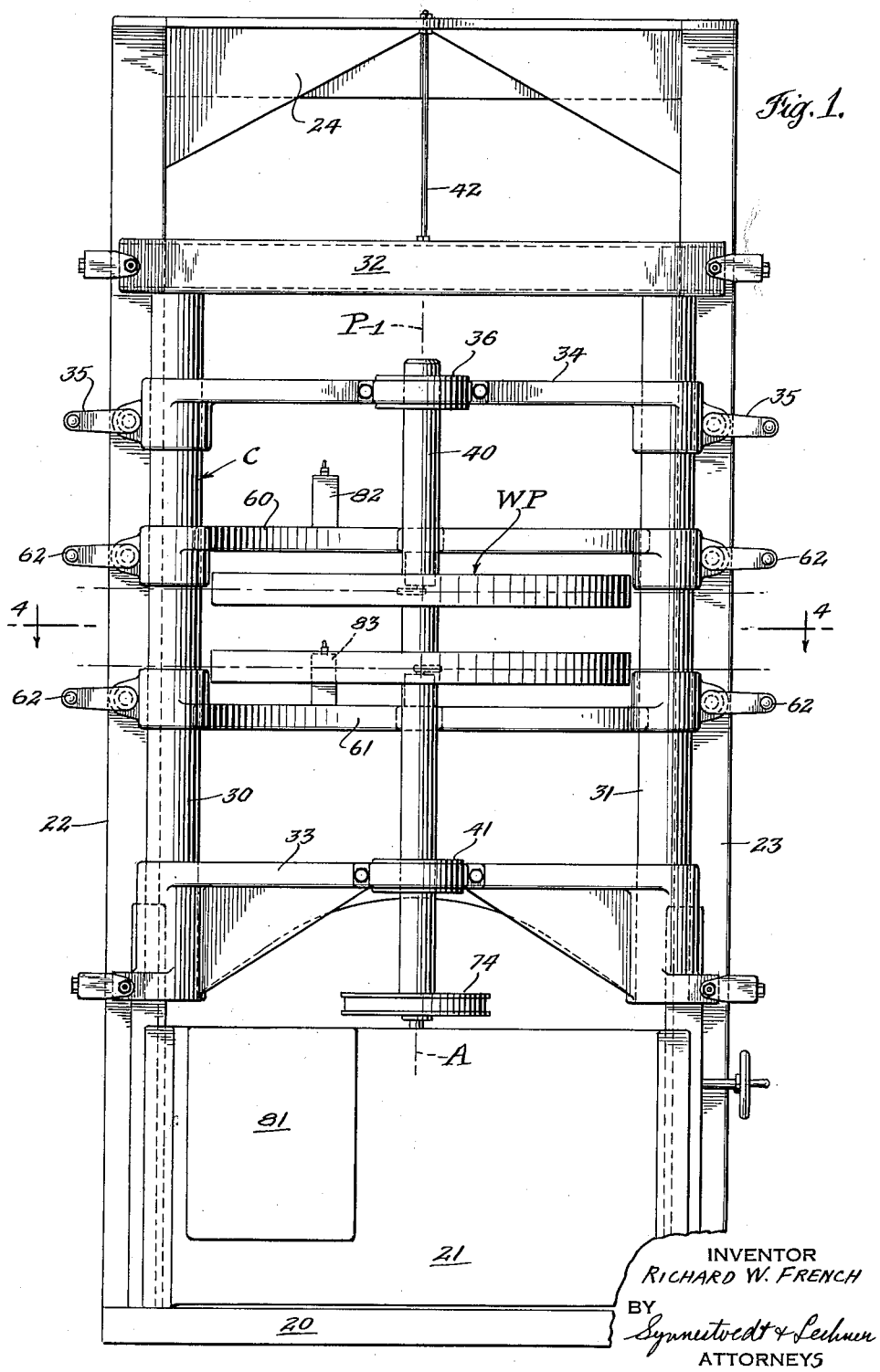

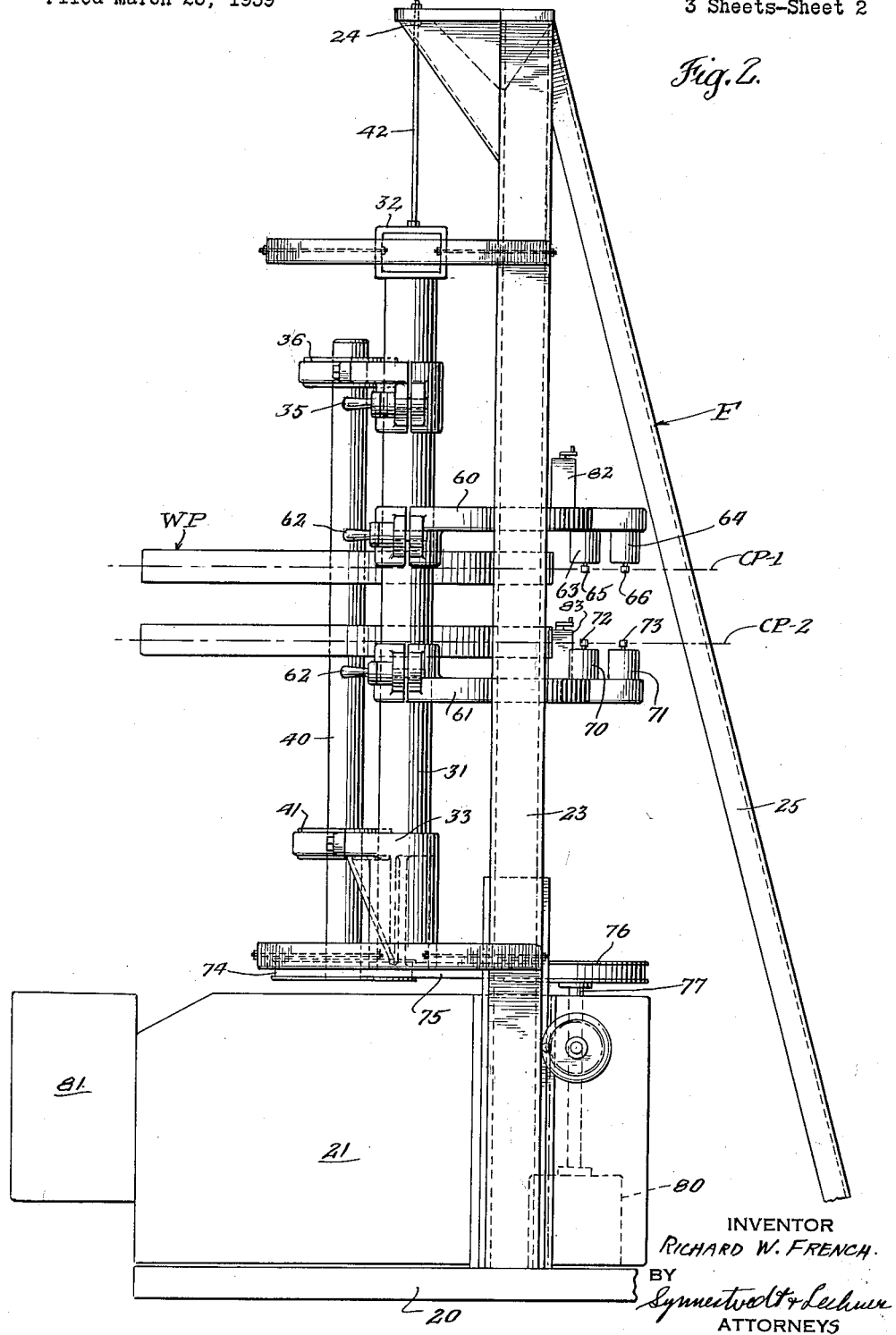

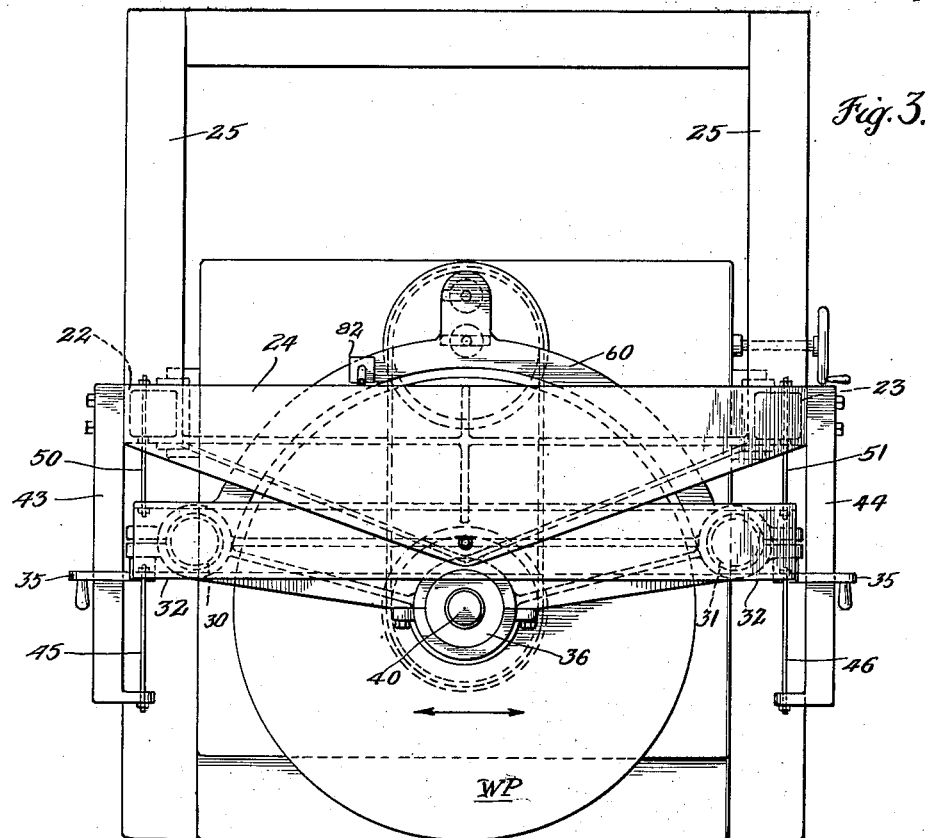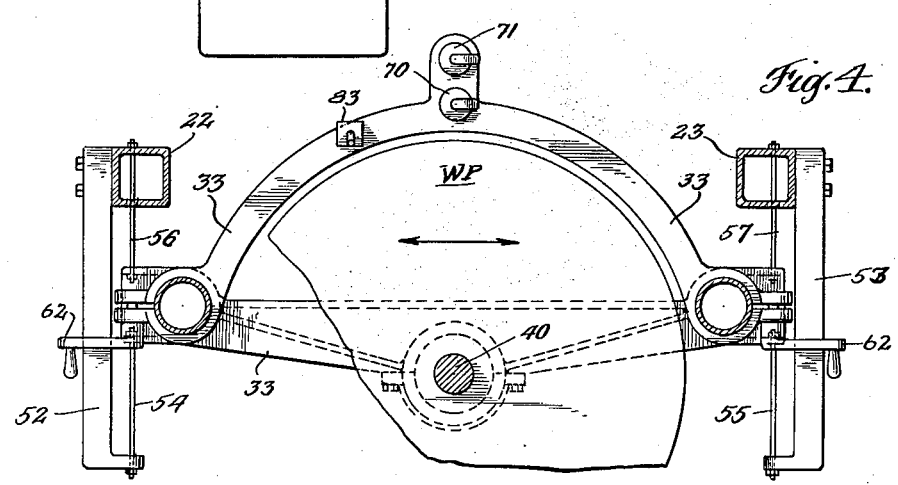

3,101,620
BALANCING EQUIPMENT
Richard W. French, Johnsville, Pa., assignor to Tinius Olsen Testing Machine Company, Willow Grove, Pa., a corporation of Pennsylvania
Filed Mar. 23, 1959, Ser. No. 801,313
2 Claims. (Cl. 73—471)

This invention relates to equipment for determining static and/or dynamic unbalance in a workpiece.

The principal object of the invention is to provide a balancing machine adapted to support a rotary workpiece for maximum amplitude of vibration for a given amount of unbalance. For this purpose, the invention contemplates a balancing machine including a cradle mounting a rotary workpiece together with elastic means supporting the cradle so as to develop minimum restraint to cradle and workpiece motion during an unbalance test.

In the preferred form the invention contemplates a cradle which supports the workpiece with its axis of rotation vertically oriented together with strain rod means connected to the top of the cradle and suspending the same from a frame and elastic rod means connected to the sides of the cradle and confining its vibration to a single plane.

Certain of the features and advantages of the invention will be apparent from the following description taken in connection with the drawings wherein:

FIGURE 1 is a front elevational view of a balancing machine wherein the workpiece is suspended with its axis of rotation extending in a vertical direction;

FIGURE 2 is an elevational view looking toward the left in FIGURE 1;

FIGURE 3 is a plan view of the machine of FIGURES 1 and 2;

FIGURE 4 is a sectional view with certain parts omitted taken along lines 4—4 of FIGURE 1.

In FIGURES 1-4 a balancing machine suspends the workpiece with its axis extending vertically. The machine includes an upright frame F, having a base 20, a cabinet structure 21 on the base, a pair of upright columns 22 and 23 which are tied together at the top by a cross piece 24. A pair of struts 25 extend from the cross piece 24 to the base 20 and provide for stability of the columns. The frame F mounts the cradle C which comprises a pair of tubular members 30 and 31 connected at the top by cross piece 32 and connected at the bottom by the cross piece 33.

Also mounted on the tubes 30 and 31 is a cross piece 34, the ends of which are of split construction so that the piece may be adjusted up and down by loosening and tightening screws operated by the handles 35. The cross piece 34 carries a journal 36 which rotatably supports one end of a shaft 40 of a workpiece generally designated by WP. The lower cross piece 33 also carries a journal 41 which also rotatably supports the shaft 40.

The cradle is suspended by means of a single elongated strain rod 42 connected between the cross piece 24 of the frame and the cross piece 32 of the cradle. The construction is such that the axis of the strain rod is co-planar with the rotational axis of the workpiece.

This manner of suspending the cradle is an important feature of the invention because it allows the cradle to vibrate with a minimum of restraint.

The vibration of the cradle is confined substantially to a single vertical plane and this is accomplished by means explained following. Near the top, the column 22 carries a forwardly extending bracket 43 and the column 23 carries a forwardly extending bracket 44. On the forward ends of the brackets 43 and 44 are elastic rods 45 and 46 which extend inwardly where they are attached to the cross piece 32 of the cradle. The columns 22 and 23 carry similar elastic rod 50 and 51 which extend forwardly where they are connected with the cross piece 32.

On the lower part of the column 22 there is a forwardly extending bracket 52 and a similar bracket 53 on the column 23. The brackets 52 and 53 carry elastic rods 54 and 55 which extend rearwardly where they are connected to the cross piece 33 of the cradle. The columns 22 and 23 carry similar elastic rods 56 and 57, which extend forwardly where they are connected with the cross piece 33.

The elastic rods 45, 46, 50, 51, 54, 55, 56 and 57 mentioned above are all flexible and will bend when a force is applied radially. Bending due to axial forces is negligible. Therefore, when the unbalance of the workpiece causes the carriage to vibrate, this motion will be confined to a vertical plane which is parallel to the axis of the piece. The strain rod 42 is also flexible and will bend to accommodate cradle vibration.

The above described cradle structure is especially useful in a machine employing compensating weights. The control system for such compensating weights is shown in my copending application 71,481, filed November 25, 1960, and being a division of this application. The manner in which the compensating weights are mounted on the cradle is described below.

The cradle has a pair of generally U-shaped cross pieces 60 and 61, the ends of which are split so that the same can be moved up and down on the cradle by tightening and loosening screws controlled by the handles 62. The cross piece 60 extends rearwardly and at the center thereof mounts synchro motors 63 and 64, the rotors of which respectively carry weights 65 and 66. The cross piece 61 carries similar motors 70 and 71, the rotors of which mount the weights 72 and 73. The weights 65 and 66 are related to the correction plane CP-1 and to a plane P-1 (FIGURE 1) containing the rotational axis of the workpiece. The weights 72 and 73 are similarly arranged in the correction plan CP-2 and in the axis plane P-1.

The workpiece is adapted to be driven by a pulley 74 connected to its lower end, the pulley 74 being driven by a belt 75 on a pulley 76 connected to a shaft 77 coupled with a motor 80 by certain gearing not shown.

The cabinet 21 carries a housing 81 which is adapted to mount the synchro generators and associated mechanism for driving the synchro motors 63, 64, 70 and 71.

The cross pieces 60 and 61 mount the pick-ups 82 and 83. These pick-ups are preferably of the type shown in copending application of Sylvester Karpchuk, Serial No. 570,960, filed March 12, 1956 (now Patent 2,946,218), assigned to the same assignee as this invention. The synchro motors 63, 64, 70 and 71 and the pick-ups 60 and 61 are all used in the control system of my copending application 71,481.

I claim:
1. In a balancing machine:
    an upright frame;
    a cradle having means to rotatably mount a workpiece to be balanced, the cardle mounting the workpiece with its axis of rotation extending vertically and the unbalance of the workpiece producing a force for causing the cradle to vibrate;
    a vertically extending strain rod connected between said frame and said cradle and suspending the cradle from the frame, the axis of the rod being co-planar with the axis of the workpiece and the strain rod permitting said cradle vibration;
    a first pair of horizontally extending elastic rods connected between said frame and said cradle adjacent the top thereof respectively on opposite sides of the rotational axis of the workpiece;

a second pair of horizontally extending elastic rods connected between said frame and said cradle adjacent the bottom thereof respectively on opposite sides of the rotational axis of the workpiece, said first and second pairs being located on one side of a vertical plane containing said cradle;

a third pair of horizontally extending elastic rods connected between said frame and said cradle adjacent the top thereof respectively on opposite sides of said rotational axis; and a fourth pair of horizontally extending elastic rods connected between said frame and said cradle adjacent the bottom thereof respectively on opposite sides of said rotational axis, said second and third pairs being located on the opposite side of said cradle containing vertical plane and all said pairs cooperating to confine cradle vibration to a vertical plane.

2. In a balancing machine:

an upright frame;

a cradle having means to rotatably mount a workpiece to be balanced, to cradle mounting the workpiece with its axis of rotation extending vertically and the unbalance of the workpiece producing a force for causing the cradle to vibrate;

vertically extending strain rod means connected between said frame and said cradle and suspending the cradle from the frame, the strain rod means permitting said cradle vibration;

first horizontally extending elastic rod means connected between said frame and said cradle adjacent the top thereof respectively on opposite sides of the rotational axis of the workpiece; and a second horizontally extending elastic rod means connected between said frame and said cradle adjacent the bottom thereof respectively on opposite sides of said rotational axis, said first and second elastic rod means cooperating to confine said cradle vibration to a vertical plane.

References Cited in the file of this patent

UNITED STATES PATENTS

| | | |
|---|---|---|
| 1,553,936 | Feeney | Sept. 15, 1925 |
| 1,554,006 | Hodgkinson | Sept. 15, 1925 |
| 1,750,608 | Summers | Mar. 11, 1930 |
| 1,867,413 | Lee | July 12, 1932 |
| 1,876,527 | Thearle et al. | Sept. 6, 1932 |
| 2,608,856 | Van Degrift | Sept. 2, 1952 |
| 2,780,939 | Kellogg | Feb. 12, 1957 |
| 2,783,648 | Stovall et al. | Mar. 5, 1957 |
| 2,882,745 | Comstock | Apr. 21, 1959 |
| 2,891,241 | Fibikar | June 16, 1959 |
| 2,943,491 | Annis | July 5, 1960 |

FOREIGN PATENTS

| | | |
|---|---|---|
| 453,595 | Germany | Dec. 10, 1927 |
| 857,694 | Germany | Dec. 1, 1952 |